Feb. 15, 1966　　C. D. S. GASKILL　　3,235,786

VOLTAGE STABILIZER WITH SERIES TRANSISTORS

Filed Feb. 12, 1962　　4 Sheets-Sheet 1

Feb. 15, 1966 C. D. S. GASKILL 3,235,786

VOLTAGE STABILIZER WITH SERIES TRANSISTORS

Filed Feb. 12, 1962 4 Sheets-Sheet 2

Feb. 15, 1966 C. D. S. GASKILL 3,235,786

VOLTAGE STABILIZER WITH SERIES TRANSISTORS

Filed Feb. 12, 1962

4 Sheets-Sheet 4

United States Patent Office 3,235,786

Patented Feb. 15, 1966

3,235,786

VOLTAGE STABILIZER WITH SERIES TRANSISTORS

Charles David Sinclair Gaskill, Hale, Altrincham, England, assignor to Industrial Processes Limited, Dublin, Eire Filed Feb. 12, 1962, Ser. No. 172,629
3 Claims. (Cl. 323—22)

The present invention relates to voltage stabilizer circuits, and especially to such circuits in which semi-conductor devices are used.

In the series stabilizers hitherto used for stabilizing voltages of the order of 250 to 300 volts, the series control element is a vacuum tube whose anode-cathod path forms the series control element, its impedance being varied as the load voltage varies. This variation is effected by comparing the load voltage with a reference voltage, and applying a signal, known as an error signal, amplified if necessary, to the control element to vary its impedance in such a way as to correct the load voltage.

Such circuits are power consuming, bulky and expensive in view of their use of two or more vacuum tubes and it is an object of the present invention to provide a high-voltage series voltage stabilizer wherein semi-conductor devices replace the vacuum tubes used in the known circuits.

According to the present invention there is provided a voltage stabilizing circuit, which comprises at least one power transistor forming the series control element of a series stabilizer, a source of a reference voltage, a comparator adapted to compare the output voltage of said circuit, or a voltage proportional thereto, with said reference voltage, and means for applying the error signal due to said comparison, or an amplified version thereof, to said transistor or transistors so as to alter the impedance offered by said transistor or transistors to the passage of current from the unstabilized input of the circuit to the output thereof, whereby a stabilization of the output voltage is achieved.

The invention will now be described with reference to the accompanying drawings, in which.

Figure 1:
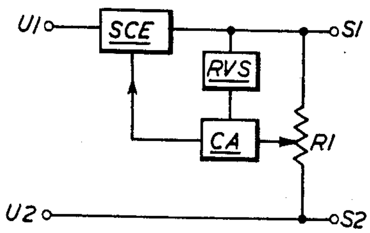
FIGURE 1 is a simplified block schematic of a series stabilizer.

In the explanatory diagram of FIGURE 1, U1 and U2 are the unstabilized input terminals to the stabilizer from an associated rectifier unit, while S1 and S2 are the stabilized output terminals between which is connected the load. Connected across the output terminals is a potentiometer R1, and the voltage present at a tapping thereon is applied to a comparator-amplifier CA. Also applied to the circut CA is the voltage across a reference voltage source RVS, whose other end is connected to the S1 side of the output. This source RVS is a device such as a Zener diode which, if suitably connected, has a substantially constant voltage drop across it.

The circuit CA compares the voltages from RVS and R1, and if the relation between these voltages is incorrect, produces an amplified error signal which is applied to a series control element SCE. The arrangement is such that if the output voltage wanders from the correct value, an error signal appropriate to that wandering is obtained from CA, and this error signal alters the impedance of SCE in such a sense and by such an amount as to correct the output voltage. The series control element can be one or more power transistors.

Figure 2:
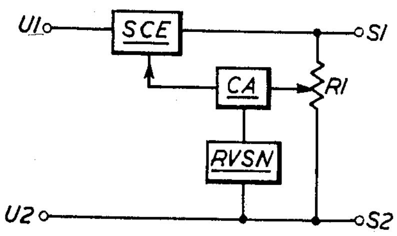
FIGURE 2 is a block schematic of a variant of the series stabilizer shown in FIGURE 1.

In FIGURE 2 the arrangement is similar to that of FIGURE 1, except that the reference voltage source RVSN is connected to the other leg of the power supply circuit. In this case the reference source can be a neon tube whose voltage is of the order of 10 to 20 volts less than that of the voltage to which the output is to be stabilized.

Figure 3:
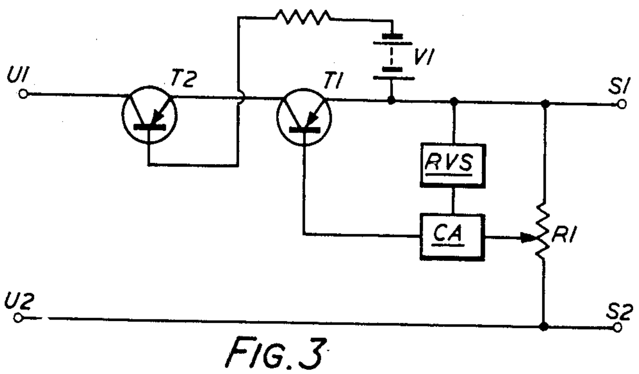
FIGURE 3 is a diagram similar to FIGURE 1, but in which a "transistorized" series control element is shown.
Figure 4:
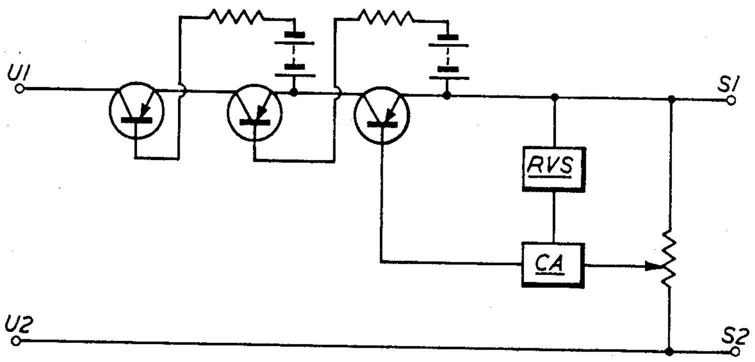
FIGURE 4 is a variant of FIGURE 3.

FIGURE 3 is similar to FIGURE 1, except that the series control element, i.e. the content of the box SCE, is shown in some detail. This consists of two power transistors T1 and T2, the collector-emitter paths of which are included in the series path between U1 and S1. It is desirable to use two transistors T1 and T2 in series so that the collector-emitter voltage on either transistor does not exceed the manufacturer's ratings. However, if a power transistor of adequate power-handling capacity is available, one such transistor could be used. The voltage of the bias source, shown as a battery V1, between the emitter of T1 and the base of T2 is slightly less than the maximum permissible collector-emitter voltage for T1. Therefore T2 acts as an emitter-follower and maintains a voltage substantially equal to V1 across T1 as long as the difference between the stabilized and unstabilized voltages is greater than V1. If the difference between these two voltages falls below V1, either due to the regulation of the rectifier and transformer, etc. or due to supply variations, T2 becomes bottomed. This is a condition where the working point of the transistor, on the collector current-collector voltage characteristic curve is on or below the knee of the curve, so that the collector current is substantially fixed and independent of the change in collector voltage.

Where the condition are such that two transistors in series cannot cope with the expected input voltage swing, three or more transistors in series may be used. FIGURE 4 shows a circuit similar to FIGURE 3, but wherein three transistors T1, T2, T3 in series are used.

Figure 5:
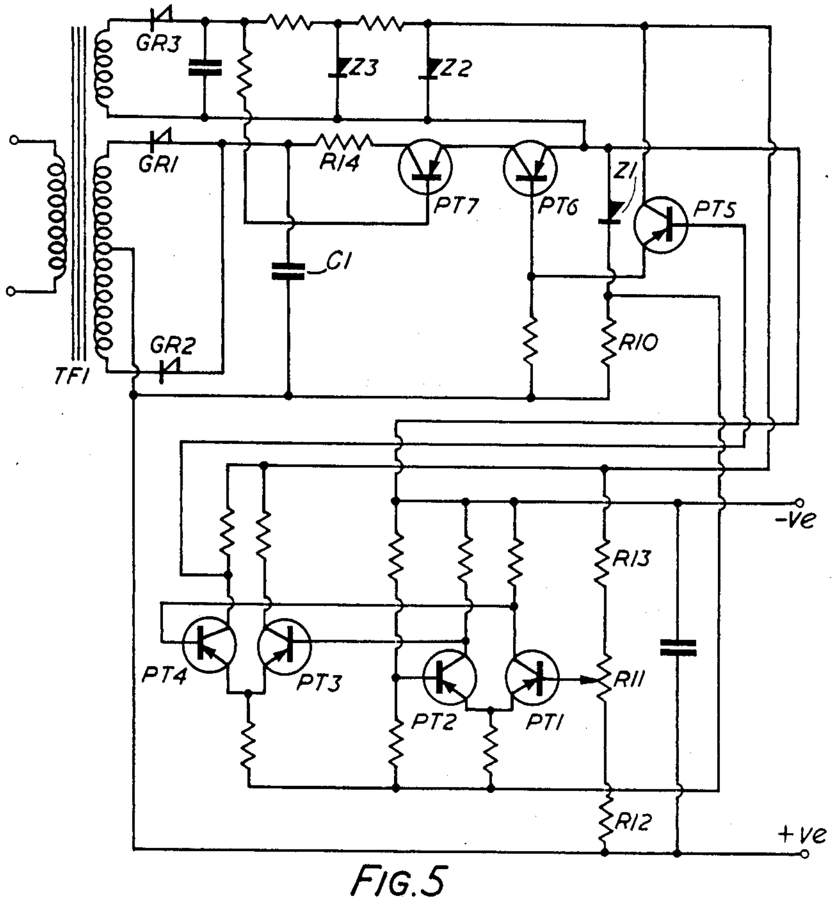
FIGURE 5 is a detailed circuit diagram of a power pack incorporating a voltage stabilizer according to the present invention.

FIGURE 5 shows a complete power pack including a transformer TF1, two rectifiers GR1 and GR2 forming a conventional full-wave rectifier, and a reservoir capacitor C1. The rectifiers are preferably germanium or silicon diodes, the reservoir capacitor has a high value, and the transformer is carefully designed, so that the regulation of this portion of the pack is made as good as is conveniently possible.

Zener diode Z1 supplies the reference source, it being well known that such a diode has a portion of its characteristics over which the voltage drop across it is substantially constant over a wide range of current. The resistor R10 in series with the diode Z1 has a value such that the maximum current rating of Z1 is not exceeded and that it is working in this constant voltage portion of the characteristic. The reference voltage forms the emitter supply voltage for the two long-tailed pairs PT1–2 and PT3–4, of which PT1–2 forms the comparator portion. The base of PT2 is connected to a fixed tap on a bleeder connected between the junction of Z1–R10 and the negative line of the stabilized supply. The base of PT1 is connected to the slider of a potentiometer R11, connected in series with resistors R12 and R13 between the positive line of the stabilized supply and an additional supply circuit. This latter includes a half-wave rectifier including a diode GR3, which supplies a voltage corresponding to V1 (FIGURE 3), and also supplies an additional voltage to increase the voltage across the potentiometer R13–R11–R12.

The output from GR3 to R13 is stabilized by Zener diodes Z2 and Z3 so that the voltage across R13–R11–R12 is increased by a substantially constant amount, and that the ratio of the voltage across the uppermost portion of the potentiometer to the voltage across the lowermost portion thereof is increased. This has the effect of increasing the loop gain of the system, i.e. of improving its response to an alteration in voltage across the load.

To return to PT1–4, which corresponds to CA in the earlier drawings, PT1 and PT2 compare the voltage on the slider R11, which may be adjusted by varying the position of the slider, with the voltage applied to the base of PT2. Hence the voltage present on the collectors of these two transistors differs by an amount dependent on the difference between the compared voltages. This difference, or error signal, is dependent on the value of the load voltage. The collectors of PT1 and PT2 are collected to the bases of PT4 and PT3 respectively, so that the voltage appearing on the collector of PT4 is an amplified error signal. This is applied via an emitter-follower transistor PT5 to the base of a transistor PT6, which corresponds to T1 (FIGURE 3). This is in series with a further transistor PT7, corresponding in function to T2 (FIGURE 3). The emitter-follower PT5 takes its collector supply from the higher voltage line, i.e. the sum of the outputs of GR1–2 and GR3, and is so arranged that it switches PT6 hard on to make the necessary corrections to the output voltage.

When the load voltage is at its desired value the above circuit is in equilibrium. However, if the load voltage alters, then an amplified error signal dependent on that alteration, both in magnitude and sense, appears on the base of PT6. This varies the collector-emitter impedance of PT6 in the direction necessary to correct the load voltage and by an amount dependent on the amplitude of the signal which appears on its base.

An important feature of the circuit shown in FIGURE 5 which has not been mentioned so far is the protective resistor R14, which protects the series transistors in the event of a momentary short circuit, e.g., due to connecting a capacitive load to the output. Since the series transistors approximate to constant current devices, the collector voltage rating could be momentarily exceeded. R14 is included in the circuit and has a value such as to limit the short circuit current to a value I1 which is the maximum permissible current of the series transistors. R14 is given by $$R=\frac{V_s}{I1}$$

where Vs is the supply voltage and R is the value of R14. Provided that PT5 can deliver a large enough current to cause PT6 to pass at least I1, the overload is avoided. It is necessary to ensure that the shunt amplifier has a short rise time.

The circuit described above is a wholly semi-conductor voltage stabilizer for relatively high voltages (250–300 volts) wherein the relatively low voltage transistors which are commercially available at a relatively low price are used. Hence it is possible to provide a cheap and compact stabilized high voltage power pack.

It will be recalled that FIGURE 2 showed a block diagram of a stabilizer using a neon tube as the reference voltage source. If it were desired to use such a tube in place of the Zener diode Z1 of FIGURE 5, the diode Z1 would be omitted and a neon tube connected between the base of PT1 and the positive supply line. This tube would have a voltage appropriate to the desired voltage across the lower portion of the potentiometer R13–R11–R12.

Figure 6:
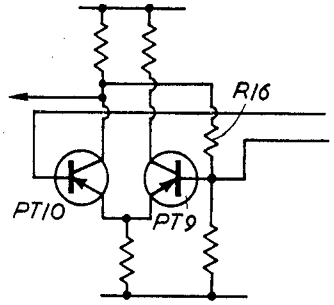
FIGURE 6 shows an alternative amplifier which may be used in place of the amplifier (PT3–PT4) of FIGURE 5.
Figure 7:
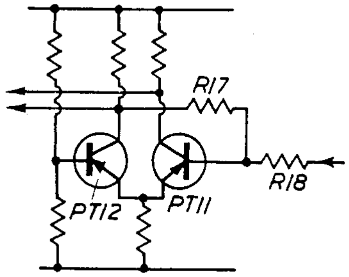
FIGURE 7 is an alternative comparator which may be used in place of the comparator (PT1–PT2) of FIGURE 5.

FIGURE 6 shows a modified form of long-tailed pair amplifier which could be used to replace PT3–PT4 in FIGURE 5, the difference being that the collector of its second transistor PT10 is connected to the base of its first transistor PT9 via a positive feedback resistor R16. This increases the gain of the amplifier formed by these two transistors. However, care in the choice of the value of R16 is necessary to avoid instability. FIGURE 7 shows the use of a similar positive feedback resistor R17 in a comparator PT11–12, which could replace PT1–2, FIGURE 5. Hence the input lead to the base of PT11 needs a resistor R18.

Figure 8:
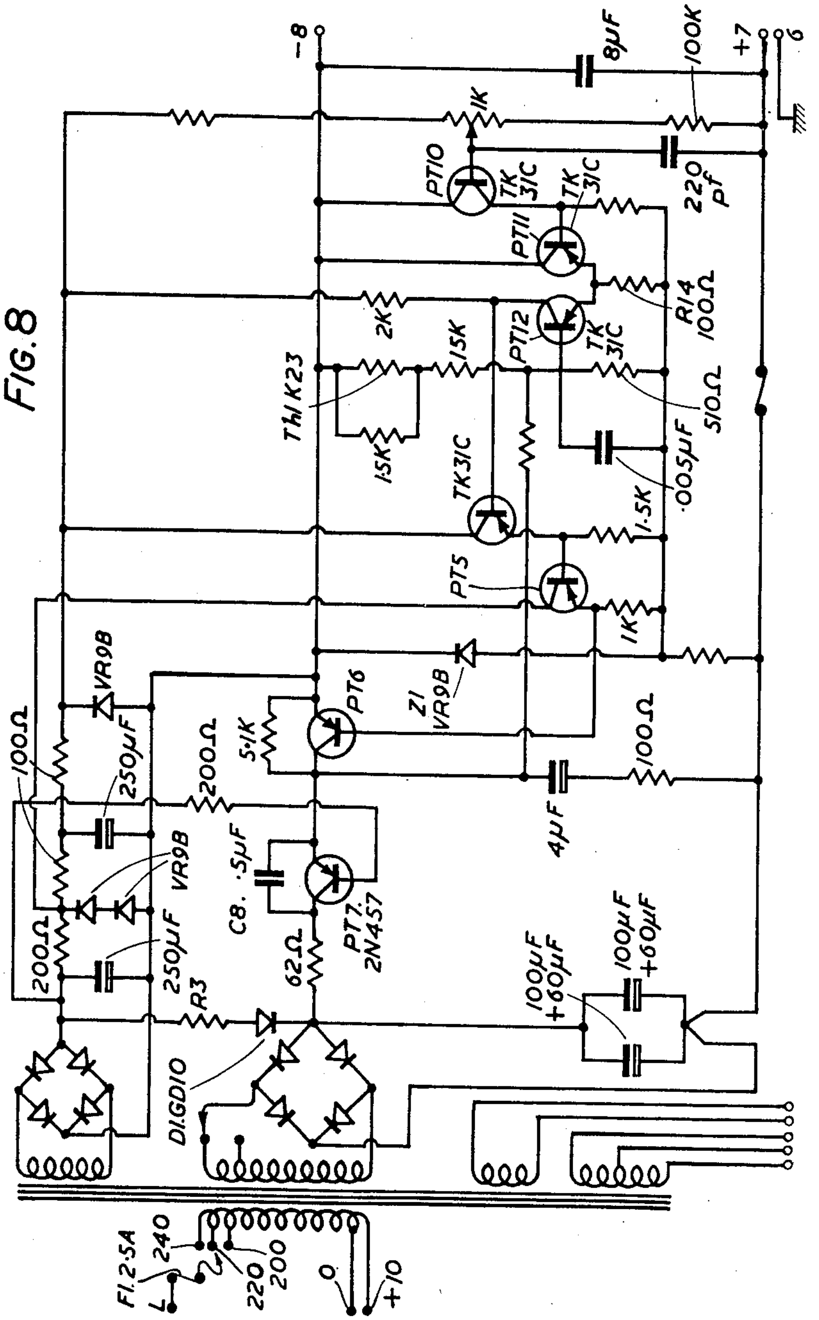
FIGURE 8 is a detailed circuit diagram of a power pack embodying the invention, in which the output voltage is 300 volts, with a range of current values of 100 to 200 milliamps.

The circuit of FIGURE 8 is generally similar to that of FIGURE 5, and will not therefore be described in great detail. One difference is that the rectifiers GR1–2 and GR3 are replaced by conventional bridge rectifiers. Another is that the outputs of the two rectifiers are connected via a circuit including resistor R3 and a diode D1, which prevent undesirable surges on switching the circuit on. Another difference is that of the two transistors in the series path, PT7 is bridged by a large capacitor C8, also to avoid surges. However, the series control element is otherwise generally as shown in FIGURE 5.

In the comparator-amplifier circuit, the voltage which is proportional to the output voltage is applied via an amplifier PT10 to the base of one transistor PT11 of a long-tailed pair whose other transistor PT12 has applied to its base a voltage proportional to the reference voltage from the Zener diode 21. The error signal from the collector of PT12 is applied to the base of PT6 via two transistors in series.

Figure 9:
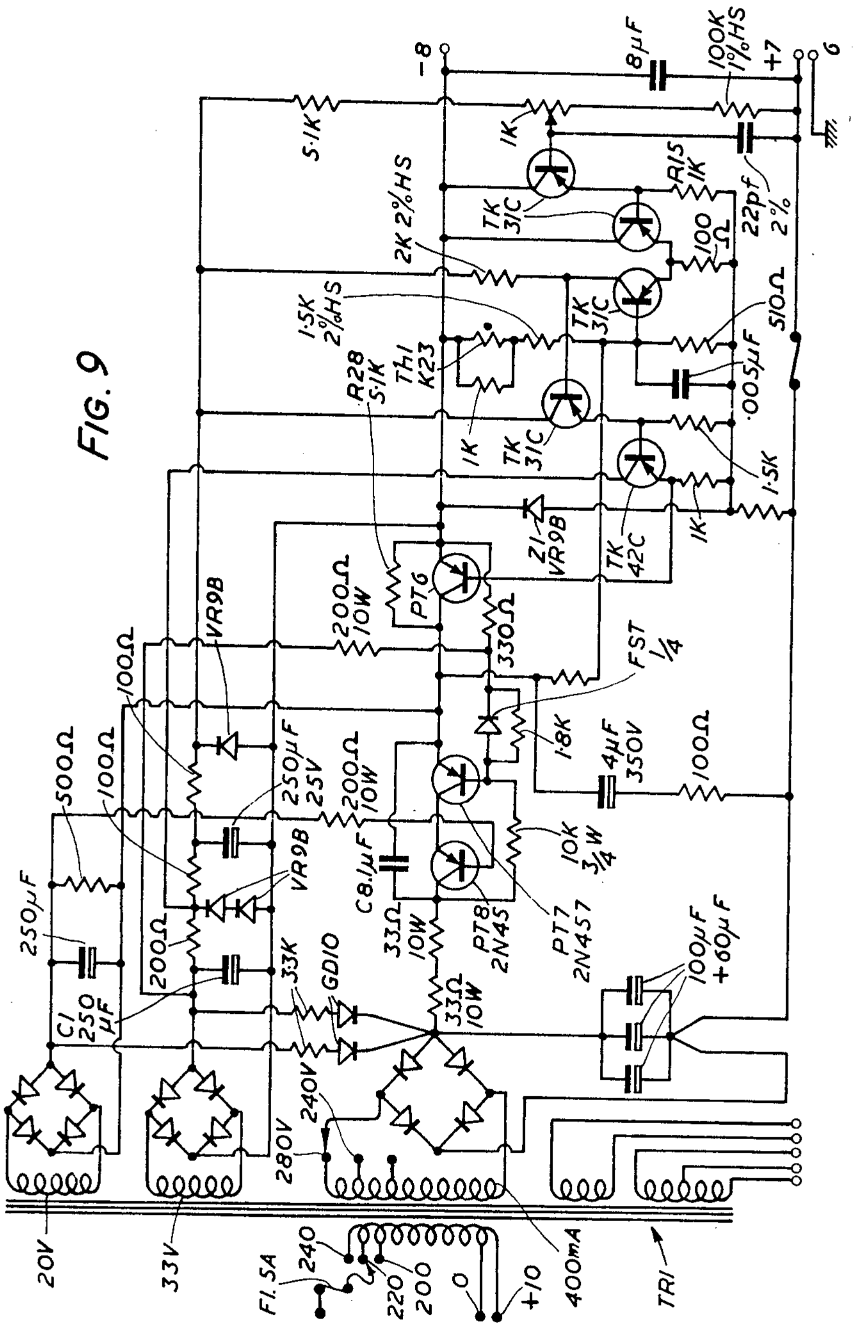
FIGURE 9 is a circuit similar to that of FIGURE 8, but for a current range of 350 to 500 milliamps.

FIGURE 9 is generally similar to FIGURE 8, but with modifications due to the use of a third transistor in the series path. Thus two separate rectifier bridge circuits are used to supply the bias-voltages for the transistors, and the capacitor C8 bridges PT8 and PT7.

I claim:

1. A voltage regulating device for connection to an input voltage source and to supply a regulated voltage to a load impedance, said device comprising input terminals for connection to said source and output terminals for connection to said load impedance, first and second transistors each including base, emitter and collector electrodes, electric connection means for connecting the collector-emitter paths of the two transistors in series in a series path between an input terminal and an output terminal, a reference voltage source, an impedance device for deriving a voltage that is a function of the voltage appearing at said output terminals, a comparator responding to said reference voltage and to said derived voltage to produce a comparison output signal, circuit means for applying said comparison signal to the base of the first transistor, a current path extending from the emitter of the first transistor to the base of the second and including a limiting voltage source and a limiting resistance whereby said second transistor functions in the emitter-follower circuit configuration with the collector-emitter path of the first transistor as an emitter load whereby to limit the voltage between collector and emitter of the first transistor to a value determined by said limiting voltage source and to cause both transistors to bottom on current overload, said limiting resistor limiting to a safe permissible value the base current of said second transistor.

2. A voltage regulating device as claimed in claim 1, and comprising more than the two said transistors, all serially connected in said series path, the base of each transistor after the first being connected to the emitter over a current path including a limiting voltage source and a limiting resistance, each said limiting resistance limiting to a safe permissable value the base current of the base to which the resistance is connected.

3. A voltage regulating device as claimed in claim 1, and including in said series path a current limiter resistance to limit the maximum current flow in said path on short circuit of said output terminals.

References Cited by the Examiner

UNITED STATES PATENTS

| | | | |
|---|---|---|---|
| 2,839,717 | 6/1958 | Mandelkehr | 323—22 |
| 2,839,717 | 6/1958 | Mandelkehr | 323—22 |
| 3,109,981 | 11/1963 | Muchnick | 323—22 |

FOREIGN PATENTS

| | | |
|---|---|---|
| 1,148,638 | 5/1963 | Germany. |
| 928,814 | 9/1963 | Great Britain. |
| 971,460 | 9/1964 | Great Britain. |

LLOYD McCOLLUM, *Primary Examiner.*

MAX L. LEVY, *Examiner.*

K. W. HADLAND, D. L. RAE, W. E. RAY, *Assistant Examiners.*